US008799989B1

(12) United States Patent
Liu (10) Patent No.: US 8,799,989 B1
(45) Date of Patent: Aug. 5, 2014

(54) NETWORK SETTINGS BROWSER SYNCHRONIZATION

(75) Inventor: Kan Liu, Mountain View, CA (US)

(73) Assignee: Google Inc., Mountain View, CA (US)

( * ) Notice: Subject to any disclaimer, the term of this patent is extended or adjusted under 35 U.S.C. 154(b) by 312 days.

(21) Appl. No.: 13/372,421

(22) Filed: Feb. 13, 2012

Related U.S. Application Data (60) Provisional application No. 61/576,942, filed on Dec. 16, 2011.

(51) Int. Cl.
| | |
|---|---|
| *H04L 29/06* | (2006.01) |
| *G06F 15/16* | (2006.01) |
| *G06F 15/177* | (2006.01) |
| *H04L 12/24* | (2006.01) |
| *H04L 29/08* | (2006.01) |

(52) U.S. Cl.
CPC ............... *H04L 63/20* (2013.01); *H04L 63/10* (2013.01); *H04L 63/102* (2013.01); *H04L 41/0893* (2013.01); *H04L 67/306* (2013.01)
USPC ......... 726/1; 726/2; 726/3; 709/219; 709/220

(58) Field of Classification Search
CPC ..... H04L 63/08; H04L 63/10; H04L 41/0893; H04L 67/306; H04L 63/102; H04L 63/20; H04L 63/0272; H04W 4/001; H04W 12/08
USPC ...................... 709/217–222, 227–229; 713/1; 726/1–3, 12–15
See application file for complete search history.

(56) References Cited

U.S. PATENT DOCUMENTS

| | | | | |
|---|---|---|---|---|
| 6,182,212 B1 * | 1/2001 | Atkins et al. | ...................... | 713/1 |
| 6,782,474 B1 * | 8/2004 | Ylonen | ......................... | 713/162 |
| 7,346,766 B2 * | 3/2008 | Mackin et al. | ................ | 713/100 |
| 8,055,743 B2 * | 11/2011 | Frutiger et al. | ............... | 709/223 |
| 8,214,880 B1 * | 7/2012 | Wu | .................... | 726/3 |
| 8,499,145 B2 * | 7/2013 | Ota et al. | ...................... | 713/153 |
| 2002/0095663 A1 * | 7/2002 | Joory | ............................ | 717/136 |
| 2003/0078987 A1 * | 4/2003 | Serebrennikov | .............. | 709/217 |
| 2004/0215748 A1 * | 10/2004 | Boonie et al. | ................. | 709/220 |
| 2005/0193103 A1 * | 9/2005 | Drabik | ......................... | 709/221 |
| 2006/0173980 A1 * | 8/2006 | Kobayashi et al. | ........... | 709/222 |
| 2006/0184998 A1 * | 8/2006 | Smith et al. | ...................... | 726/3 |
| 2006/0185001 A1 * | 8/2006 | Stieglitz et al. | ................... | 726/4 |
| 2008/0313447 A1 * | 12/2008 | Gillett et al. | ..................... | 713/1 |

(Continued)

OTHER PUBLICATIONS

"Remote VPN tutorial", 2008, 8 pages, retrieved from http://cservices.atu.edu.*

(Continued)

*Primary Examiner* — Catherine Thiaw (74) *Attorney, Agent, or Firm* — McDermott Will & Emery LLP (57) ABSTRACT

Computer-implemented methods for automatically configuring a device with network settings retrieved using a web browser are provided. In one aspect, a method includes receiving a user identification associated with a user web browser profile from a web browser on a device, and retrieving network setting information associated with the user web browser profile. The method also includes providing the retrieved network setting information to the web browser of the device. The retrieved network setting information is configured to be used by the web browser to configure the device to connect to at least one network. Systems and machine-readable media are also provided.

16 Claims, 7 Drawing Sheets

(56) References Cited

U.S. PATENT DOCUMENTS

| | | |
|---|---|---|
| 2009/0019115 A1* | 1/2009 | Larson et al. ............. 709/206 |
| 2009/0067441 A1* | 3/2009 | Ansari et al. ............. 370/401 |
| 2009/0089874 A1* | 4/2009 | Mohanty et al. ............. 726/15 |
| 2009/0125612 A1* | 5/2009 | Rabetge et al. ............. 709/220 |
| 2009/0319649 A1* | 12/2009 | Larsen et al. ............. 709/222 |
| 2010/0048173 A1* | 2/2010 | Ross et al. ............. 455/411 |
| 2010/0095365 A1* | 4/2010 | Hsu et al. ............. 726/11 |
| 2010/0162125 A1* | 6/2010 | Alfred et al. ............. 715/738 |
| 2010/0180016 A1* | 7/2010 | Bugwadia et al. ............. 709/220 |
| 2010/0228836 A1* | 9/2010 | Lehtovirta et al. ............. 709/220 |
| 2010/0257584 A1* | 10/2010 | Meenan et al. ............. 726/1 |
| 2010/0318686 A1* | 12/2010 | Ver Steeg et al. ............. 710/8 |
| 2010/0333166 A1* | 12/2010 | Herrod ............. 726/1 |
| 2011/0093941 A1* | 4/2011 | Liu et al. ............. 726/7 |
| 2011/0235549 A1* | 9/2011 | Ahlers et al. ............. 370/255 |
| 2012/0005586 A1* | 1/2012 | Uola et al. ............. 715/740 |
| 2012/0016939 A1* | 1/2012 | Cheah ............. 709/205 |
| 2012/0110640 A1* | 5/2012 | Donelson et al. ............. 726/3 |
| 2012/0144307 A1* | 6/2012 | Tan et al. ............. 715/735 |
| 2012/0174212 A1* | 7/2012 | Dart et al. ............. 726/19 |
| 2012/0240183 A1* | 9/2012 | Sinha ............. 726/1 |
| 2012/0291106 A1* | 11/2012 | Sasaki ............. 726/5 |

OTHER PUBLICATIONS

"How to configure Proxy settings in windows 7", 2009, 3 pages, retrieved from http://answers.oreilly.com/topic/675-how-to-configure-proxy-settings-in-windows-7/.*

* cited by examiner

Friends — x — +

← → C ⟲ | www.friendsencyclopedia.com

Friends
The Free Encyclopedia

Main page
Contents
Featured content
Current events
Random article
Donate to Friends ▼ Interaction
  Help
  About Friends
  Community portal
  Recent Changes
  Contact Friends ▶ Toolbox ▶ Print/export ▼ Languages
  Simple English
  العربية
  Bahasa Indonesia
  Bahasa Melayu
  Català
  Česky
  Dansk
  Deutsch
  Eesti
  Ελληνικά

Main Page | Discussion | Read | View source | ▼ Search

218

🔐 Login / create account

□ ⬚ ✕
☆ 🔑

• Arts          • History        • Society
• Biography     • Mathematics    • Technology
• Geography     • Science        • All portals

Welcome to Friends,
the free encyclopedia that anyone can edit.
3,784,217 articles in English

Today's featured article

The 1919 Perfect Storm was a powerful storm that lashed the East Coast of the United States for several days with 30 ft (9.1 m) waves. The initial area of low pressure developed off Atlantic Canada on October 28 and moved westward toward New England. It absorbed Hurricane Grace to its south and intensified significantly. The center remained offshore, although the high waves caused over $200 million in damage (1991 USD) and 13 deaths. More than 38,000 people were left without power, and along the coast high waves inundated roads and buildings. In portions of New England, damage was worse than Hurricane Bob had caused two months prior. Aside from tidal flooding along rivers, the storm's effects were primarily concentrated along the coast. In the middle of the storm, the Andrea Gail sank, killing its crew of six and inspiring a book and later a movie. It later received the name "the Perfect Storm: after a conversation between Boston National Weather Service forecaster Kelly Case and author Nicoles Junger. After moving over the Gulf stream, the system evolved into a small hurricane that dissipated after striking Nova Scotica. (more...)

Recently featured: *The Human Centipede (First Sequence)* - Manchester United F.C. - John Smith Archive - By email - More featured articles...

Did you know...

In the news

- UNESCO becomes the first UN agency to admit Palestine as a full member state.
- Major Airline resumes flights after President orders the airline and trade unions to end industrial action.
- Labour Party candidate John E. Doe *(pictured)* is elected President of Ireland.
- In baseball, the St. Louis Cardinals defeat the Texas Rangers to win the World Series.
- The Theatre in Moscow reopens after a six-year, 21-billion-ruble [US$680-million] renovation.
  friendsnews - Recent deaths - More current events...

422

On this day...

November 1: All Saint's Day in Western Christianity; Independence Day in Antigua and Barbuda (1981); Rajyotsava (Formation Day) in Karnataka, India (1956)

- 996 - Holy Roman Emperor Otto III issued document that contained the earliest known use of ,Osterrichi" the Old High German name of Austria.

FIG. 5

NETWORK SETTINGS BROWSER SYNCHRONIZATION

CROSS-REFERENCE TO RELATED APPLICATIONS

The present application claims the benefit of priority under 35 U.S.C. §119 from U.S. Provisional Patent Application Ser. No. 61/576,942 entitled "Network Settings Browser Synchronization," filed on Dec. 16, 2011, the disclosure of which is hereby incorporated by reference in its entirety for all purposes.

BACKGROUND

1. Field

The present disclosure generally relates to the transmission of data over a network, and more particularly to the use of a computing device to communicate over a network.

2. Description of the Related Art

Users that enter and save network information for various networks, such as network names and passwords for wireless networks, on one device must typically repeat the entry of the same network information on another device in order to have the other device connect to the same networks in the same way. This is difficult for users to do because it requires the users to remember all of the network information that they have previously added, usually over the course of several months.

SUMMARY

According to one embodiment of the present disclosure, a computer-implemented method for automatically configuring a device with network settings retrieved using a web browser is provided. The method includes receiving a user identification associated with a user web browser profile, and retrieving network setting information associated with the user web browser profile. The method also includes providing the retrieved network setting information to a web browser of a device. The retrieved network setting information is configured to be used by the web browser to configure the device to connect to at least one network.

According to another embodiment of the present disclosure, a system for automatically configuring a device with network settings retrieved using a web browser is provided. The system includes a memory that includes network setting information associated with a user web browser profile, and a processor. The processor is configured to receive a user identification associated with the user web browser profile, and retrieve the network setting information associated with the user web browser profile. The processor is also configured to provide the retrieved network setting information to a web browser of a device. The retrieved network setting information is configured to be used by the web browser to configure the device to connect to at least one network. The network setting information includes wireless network access point settings, virtual private network settings, and proxy settings.

According to a further embodiment of the present disclosure, a machine-readable storage medium including machine-readable instructions for causing a processor to execute a method for automatically configuring a device with network settings retrieved using a web browser is provided. The method includes receiving a user identification associated with a user web browser profile and retrieving network setting information associated with the user web browser profile and designated as unsecured or secured. The method also includes providing the retrieved network setting information designated as unsecured or secured to a web browser on a device, and restricting access of the web browser to network settings designated as private. The retrieved network setting information is configured to be used by the web browser to configure the device to connect to at least one network.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings:

FIGS. 4A-4C are exemplary screenshots associated with the exemplary process of FIG. 3.

DETAILED DESCRIPTION

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

The disclosed web browser, when running on a first device, downloads a user's network settings (e.g., for wireless networks, virtual private networks, or proxy connections) from a server and applies those network settings to the first device. The user's network settings on the server are based on the user's network settings from an associated web browser on a second device. The web browsers on the first and second clients are associated using a web browser profile of the user. Network settings for the web browsers are stored on the server based on the web browser profile.

By way of example, if a user signs in with an account (e.g., a web browser profile) to a web browser on the user's laptop and sets up network settings for a wireless network "corporate," then when the user signs in with the same account to the same type of web browser on the user's desktop, the web browser on the desktop will automatically download the network settings for the wireless network "corporate" and connect to the wireless network "corporate" if it is available. A network's settings can be automatically shared between device browsers, manually shared between device browsers, or not shared between device browsers based on security levels associated with each network setting.

Although many examples provided herein describe a user's information (e.g., network setting information and web browser profiles) being stored in memory, the user can, at any time, delete the user information from memory and/or opt out of having the user information stored in memory. Additionally, the user can, at any time, adjust appropriate privacy settings to selectively limit the types of user information stored in memory, or select the memory in which the user information is stored (e.g., locally on the user's device as opposed to remotely on a server). In many examples, the user information does not include and/or share the specific identification of the user (e.g., the user's name) unless otherwise specifically provided or directed by the user.

Figure 1:
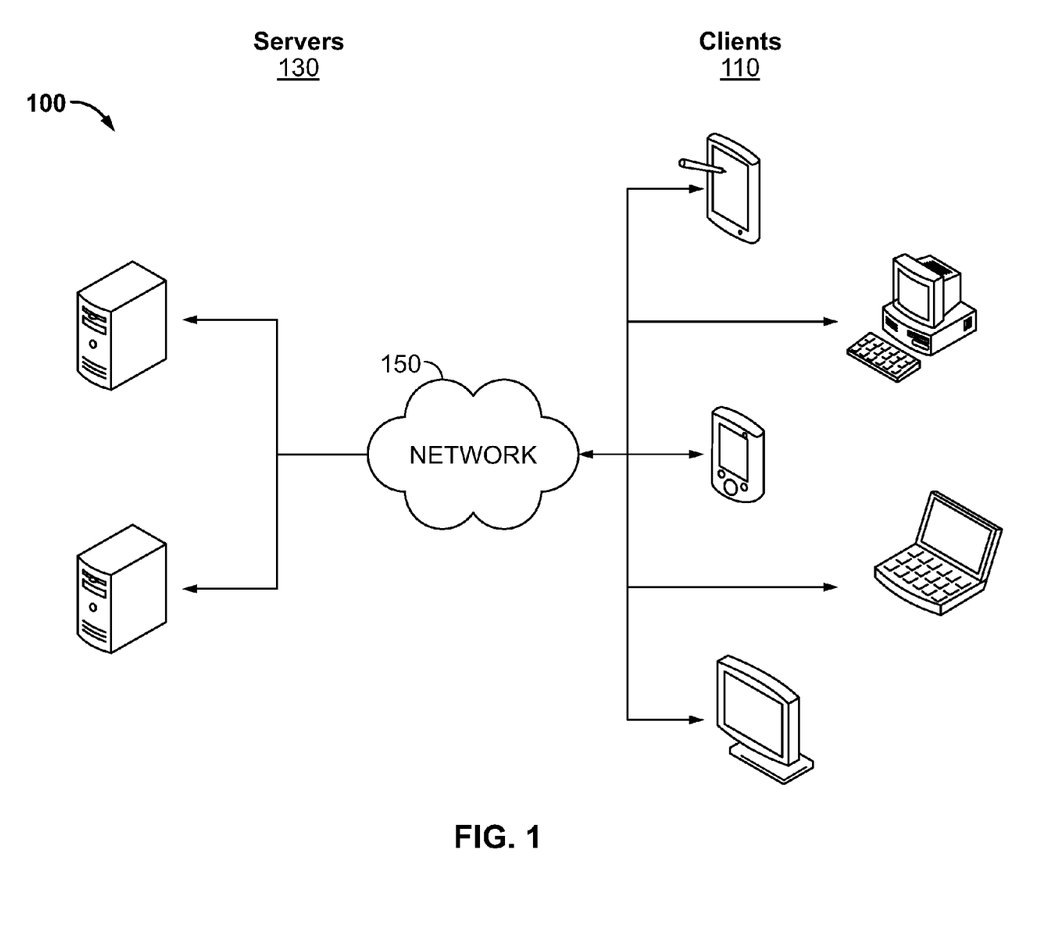
FIG. 1 illustrates an exemplary architecture for automatically configuring a device with network settings retrieved using a web browser.

FIG. 1 illustrates an exemplary architecture 100 for automatically configuring a device with network settings retrieved using a web browser. The architecture 100 includes servers 130 and clients 110 connected over a network 150.

The servers 130 are configured to host network setting information and data for web browser profiles of users. For purposes of load balancing, one or multiple servers 130 can each separately host the network setting information and the data for profiles. Similarly, for purposes of load balancing, one or multiple servers 130 can share the hosting of the network setting information and the profiles.

The profiles on the server 130 include, for each profile, authentication information (e.g., an associated user identification, such as a username and password). The network setting information includes information on configuring a client 110 to connect to a data network. Network setting information can be, for example, a network address, network password, and network authentication protocol. Each profile is associated with corresponding network setting information if such network setting information is available for the profile. A web browser on a client 110 that is configured to authenticate a user profile with a server 130 is also configured to obtain network setting information associated with that authenticated user profile in order to configure the client 110 to connect to a network.

The disclosed architecture 100 allows a web browser of one of the clients 110 (a "first client") to automatically upload network setting information the first time a user provides a web browser profile associated with the user to the web browser. The network setting information can be, for example, for connecting to wireless networks, connecting to virtual private networks (VPN), or configuring proxy settings. When the web browser profile is first provided to the web browser and first authenticated by a corresponding server 130, the server 130 creates a stores a reference for the web browser profile of the user on the server 130 and requests a copy of the network setting information from the web browser of the first client 110. The web browser on the first client 110 then provides the network setting information to the server 130, which stores the network setting information in association with the web browser profile of the user.

If the user later provides the same web browser profile to a second, similarly configured web browser on a second client 110, then the second web browser on the second client 110 downloads the network setting information of the user from the server 130 and configures the second client to automatically connect to the same networks as the first client 110. As a result, the user does not need to re-enter the same network setting information on the second client as the first client, but the second client 110 will still automatically connect to the same networks as the first client. In certain aspects, the second client 110 can be restricted from automatically downloading certain network information and/or connecting to certain networks based on restriction settings set by the user or by the web browser on the first client 110.

The servers 130 can be any device having an appropriate processor, memory, and communications capability for hosting the network setting information and the profiles. The clients 110 to which the servers 130 are connected over the network 150 can be, for example, desktop computers, mobile computers, tablet computers, mobile devices (e.g., a smartphone or PDA), set top boxes (e.g., for a television), video game consoles, or any other devices having appropriate processor, memory, and communications capabilities for running a web browser. The network 150 can include, for example, any one or more of a personal area network (PAN), a local area network (LAN), a campus area network (CAN), a metropolitan area network (MAN), a wide area network (WAN), a broadband network (BBN), the Internet, and the like. Further, the network 150 can include, but is not limited to, any one or more of the following network topologies, including a bus network, a star network, a ring network, a mesh network, a star-bus network, tree or hierarchical network, and the like.

Figure 2:
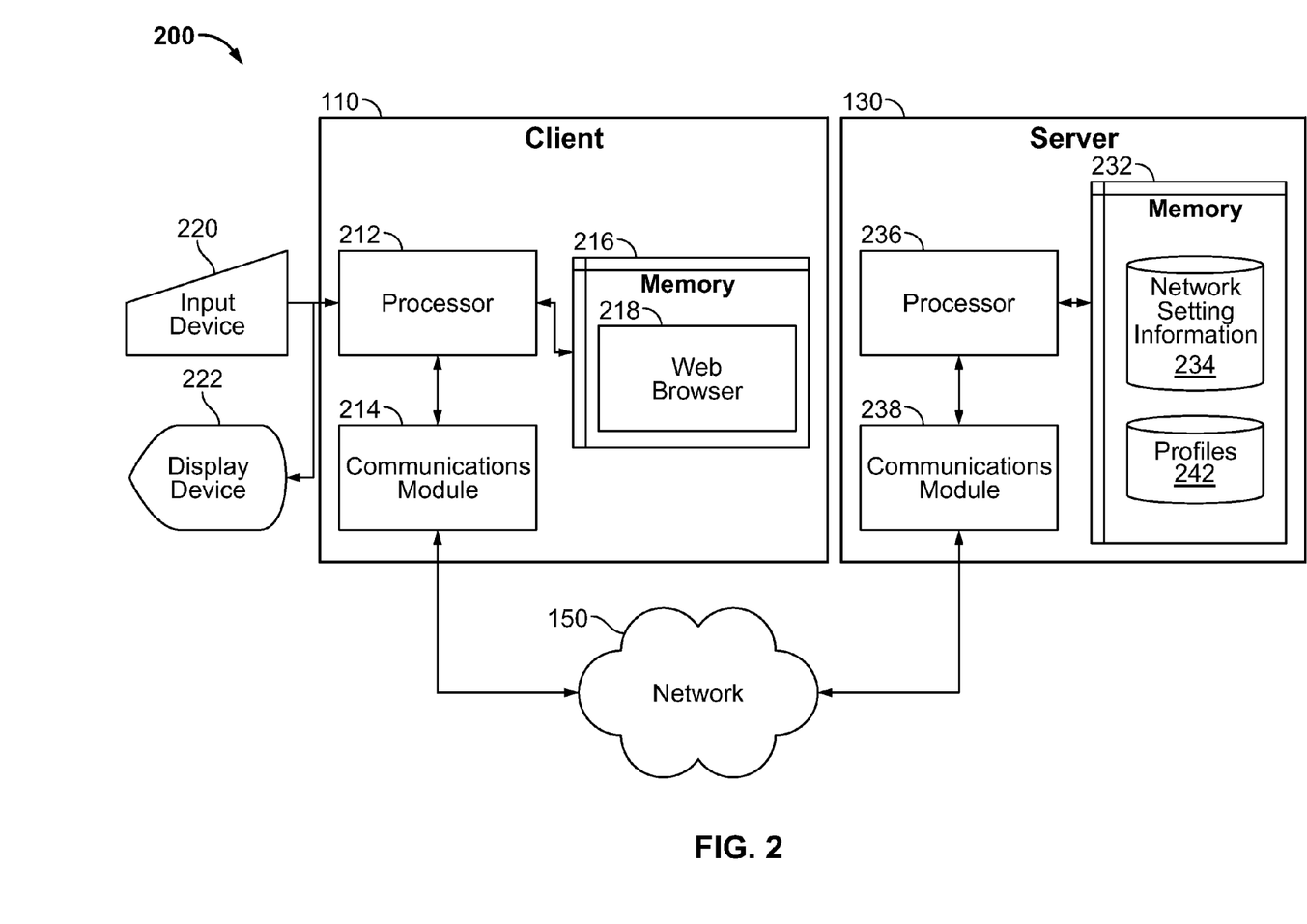
FIG. 2 is a block diagram illustrating an exemplary client and server from the architecture of FIG. 1 according to certain aspects of the disclosure.

FIG. 2 is a block diagram 200 illustrating an exemplary server 130 and client 110 in the architecture 100 of FIG. 1 according to certain aspects of the disclosure. The client 110 and the server 130 are connected over the network 150 via respective communications modules 214 and 238. The communications modules 214 and 238 are configured to interface with the network 150 to send and receive information, such as data, requests, responses, and commands to other devices on the network. The communications modules 214 and 238 can be, for example, modems or Ethernet cards.

The server 130 includes a processor 236, a communications module 238, and a memory 232. The memory 232 includes network setting information 234 and profiles 242. Although the memory 232 of the server 130 is illustrated as including the network setting information 234 and the profiles 242, the network setting information 234 and the profiles 242 can be hosted on separate servers as discussed above. The profiles 242 include information on user web browser profiles, such as user names (e.g., email addresses) and passwords. The profiles 242 also include, for each user web browser profile, an association between the profile and network setting information 234, if such information exists for the profile.

The network setting information 234 for each profile can include network settings designated as at least one of unsecured, secured, or private. Exemplary unsecured network settings include wireless network access point names (e.g., for WiFi networks). Unsecured network settings can be stored in the network setting information 234 on a server 130, and downloaded to a client 110 from the server 130. When downloaded to the client 110 in response to a user providing an authenticated log in for a user web browser profile, unsecured network settings can be stored in an area in memory 216 (e.g., a folder) associated with the user. The unsecured network settings can be publicly accessible to other authenticated users of the client 110.

Exemplary secured network settings, such as network settings tied to a specific network, include wireless network access point names, wireless network access point passwords, wireless network access point security protocols, wireless network access point Media Access Control (MAC)

filtering information, and proxy settings (e.g., a network address and/or port number). Settings for each secure network can be individually selected by a user for storage in the network setting information 234 on a server 130, and thereby selected for downloading to a client 110 of the user from the server 130 if available. In certain aspects, when secure network settings are downloaded to the client 110 in response to the user providing an authenticated log in for a user web browser profile, secured network settings can be stored in an area in memory 216 (e.g., a folder) associated with the user. The secured network settings can be selectively configured by the user to be publicly accessible to other authenticated users of the client 110. Downloaded wireless network access point passwords can be restricted from display on the client 110.

Exemplary private network settings include virtual private network (VPN) network settings tied to a specific enterprise (e.g., business or government). Exemplary VPN network settings include passwords, biometrics, two-factor authentication, cryptographic information, and digital certificates. In certain aspects, private network settings initially configured by a user on a client 110 are not configured for synchronization (e.g., available for upload) to storage in the network setting information 234 on a server 130, and thereby private network settings are not shared between web browsers on different clients 110 associated with the same user web browser profile.

In certain aspects, the network setting information 234 (e.g., for network settings designated as unsecured or secured) on the server 130 that is associated with a profile from the profiles 242 is updated regularly. For example, the network setting information 234 can be updated by a communication from a web browser 218 on a client 110 associated with the profile when the web browser 218 updates its own network setting information (e.g., based on information received from a user). The web browser 218 being associated with the profile can include the web browser 218 being signed in to by a user name and password associated with the profile in order to synchronize the network setting information 234.

The processor 236 of the server 130 is configured to execute instructions, such as instructions physically coded into the processor 236, instructions received from software in memory 232, or a combination of both. For example, the processor 236 of the server 130 executes instructions to receive a user identification associated with a user web browser profile (e.g., from the web browser 218 on the client 110), and retrieve network setting information 234 associated with the user web browser profile (e.g., as identified from the profiles 242 stored in memory 232). The processor 236 is configured to provide the retrieved network setting information 234 to the web browser 218 (e.g., on client 110) associated with the user web browser profile. Providing the retrieved network setting information 234 to the web browser 218 can include providing network settings designated as unsecured or secured, and restricting access of the web browser to network settings designated as private as discussed above.

The retrieved network setting information 234 is configured to be provided by the web browser 218 of the client 110 to a network interface of the client 110. The network interface on the client 110 can be, for example, an application programming interface (API) specific to an operating system running on the client 110. By providing the retrieved network setting information 234 to the network interface, the web browser 218 on the client 100 configures the client 110 with the retrieved network setting information. As a result, the client 110 can automatically connect to an available network based on the configuration.

Figure 3:
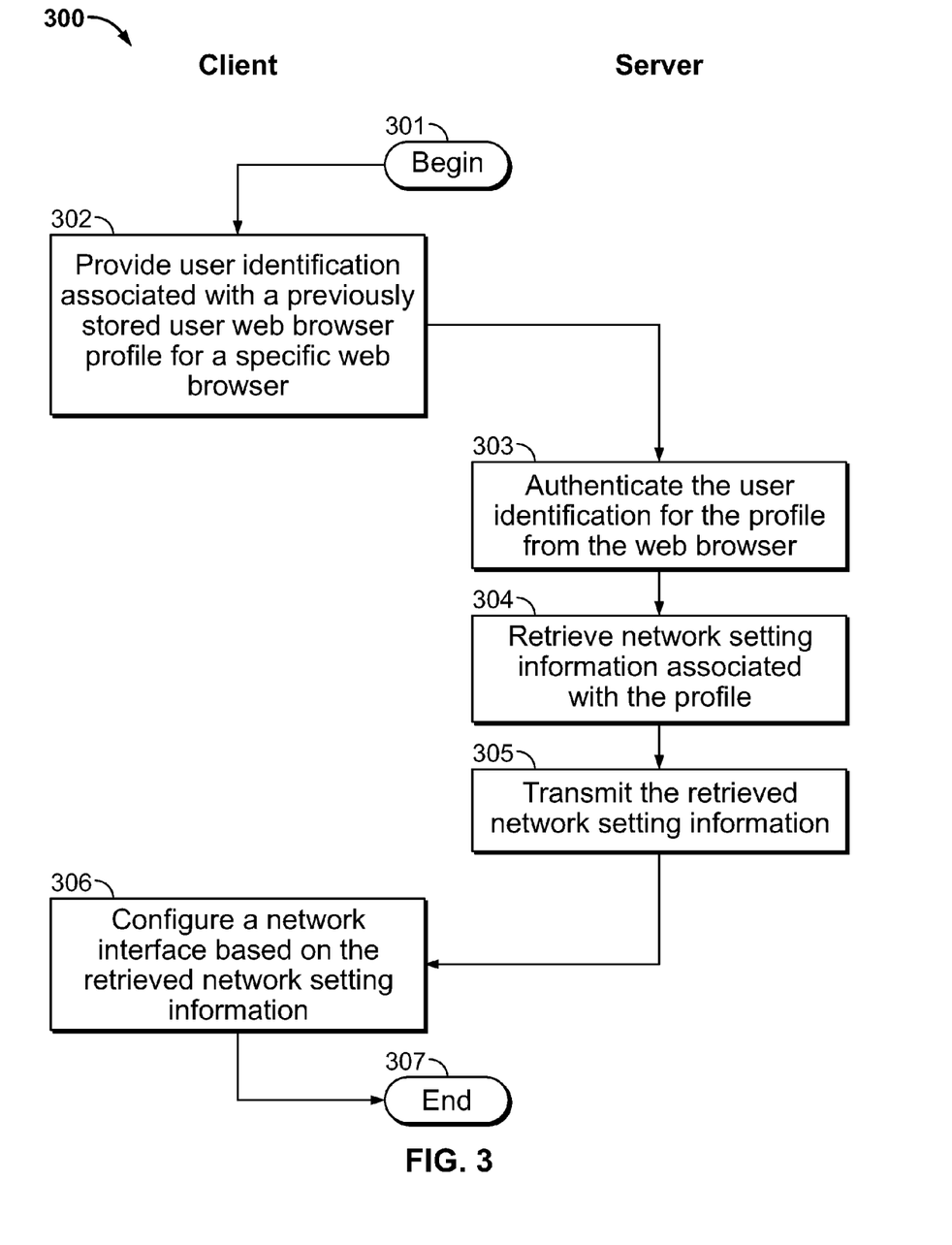
FIG. 3 illustrates an exemplary process for automatically configuring a device with network settings retrieved using a web browser using an exemplary client and server of FIG. 2.

FIG. 3 illustrates an exemplary process 300 for automatically configuring a device with network settings retrieved using a web browser using the exemplary client 110 and server 130 of FIG. 2. The process 300 begins by proceeding from step 301 when a user loads the web browser 218 on the client 110 to step 302 in which the user provides (e.g., using input device 220) a user identification associated with a previously stored user web browser profile to the web browser 218. The login is provided by the client 110 (e.g., the processor 212 of the client 110) to the server 130 over the network 150. In step 303, the server 130 authenticates the user identification for the profile from the web browser 218. In step 304, the server 130 retrieves network setting information 234 associated with the profile, and in step 305 transmits the retrieved network setting information 234 to the web browser 218 of the client 110. In step 306, the web browser 218 configures a network interface of the client 110 based on the retrieved network setting information 234. The process 300 then ends in step 307.

Figure 4A:
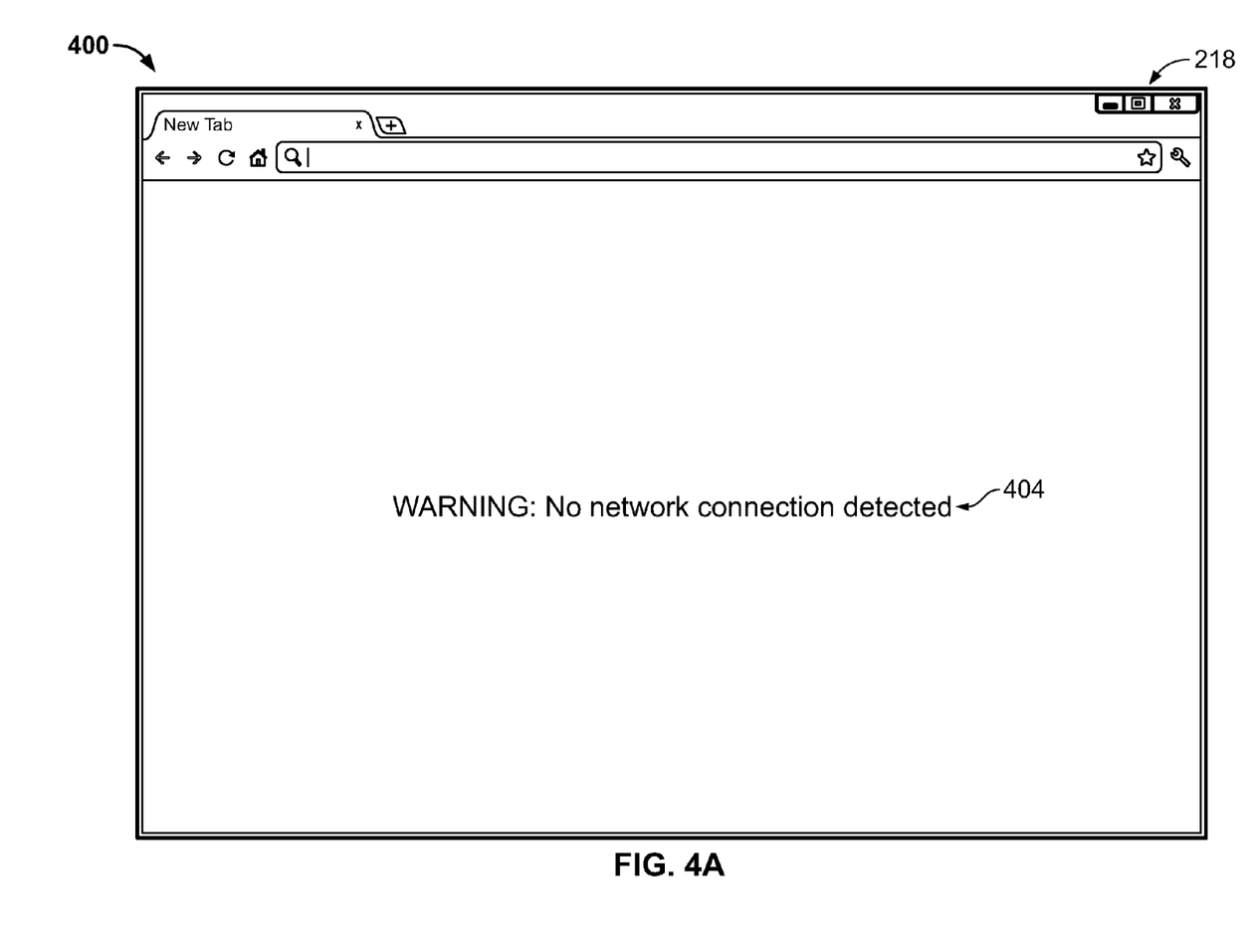
Figure 4B:
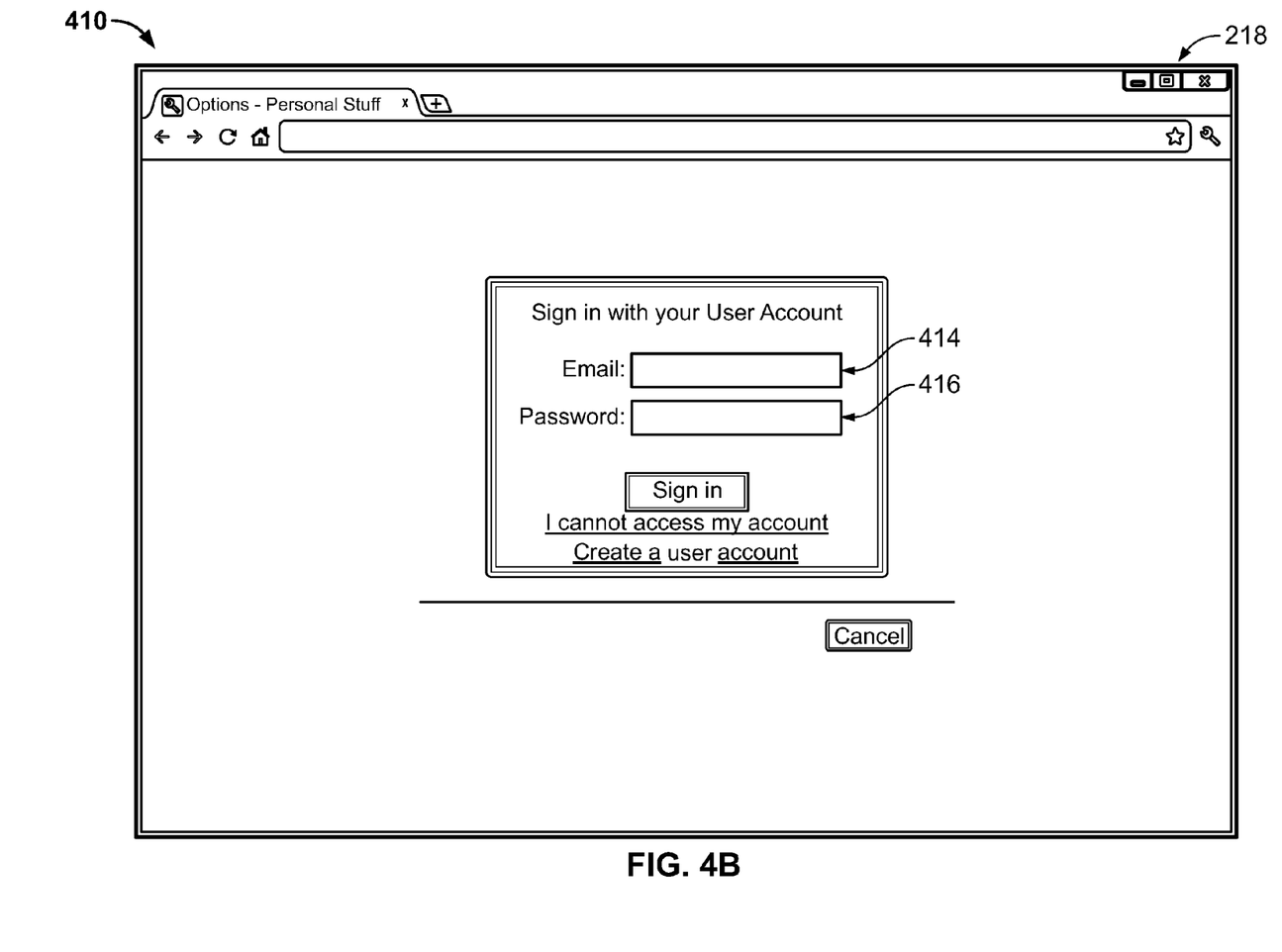

An example will now be described using the exemplary process 300 of FIG. 3 and a client 110 that is a laptop computer. The process 300 begins by proceeding from step 301 when a user loads the web browser 218 on the laptop computer 110 as illustrated in FIG. 4A, an exemplary screenshot 400 of the web browser 218. The web browser 218 displays a message 404 (e.g., on display device 222) that a network connection is not detected for the web browser 218. In step 302, the user provides an email address and password associated with a previously stored user web browser profile to the web browser 218. FIG. 4B illustrates an exemplary screenshot 410 of the user interface of the web browser 218 to which the user provides the email address and password. The login is provided by the web browser 218 to the server 130 over the network 150. In step 303, the server 130 authenticates the email address and password for the profile from the web browser 218.

In step 304, the server 130 retrieves network setting information 234 associated with the profile, including a name "corporate" for a wireless network access point and an associated password for the "corporate" network, and in step 305 transmits the retrieved network setting information 234 to the web browser 218 of the laptop computer 110. In step 306, the web browser 218 configures the laptop's operating system network interface with the network setting information, including configuring the laptop computer 110 to automatically connect to the "corporate" network when available with the appropriate password. The "corporate" network is available to the laptop computer 110, so the laptop computer 110 automatically connects to the "corporate" network, thereby providing a network connection for the web browser 218. As illustrated in FIG. 4C, an exemplary screenshot 420 of the web browser 218 after the laptop computer 110 has connected to the "corporate" network, the web browser 218 can load web pages from the Internet. The process 300 then ends in step 307.

Figure 5:
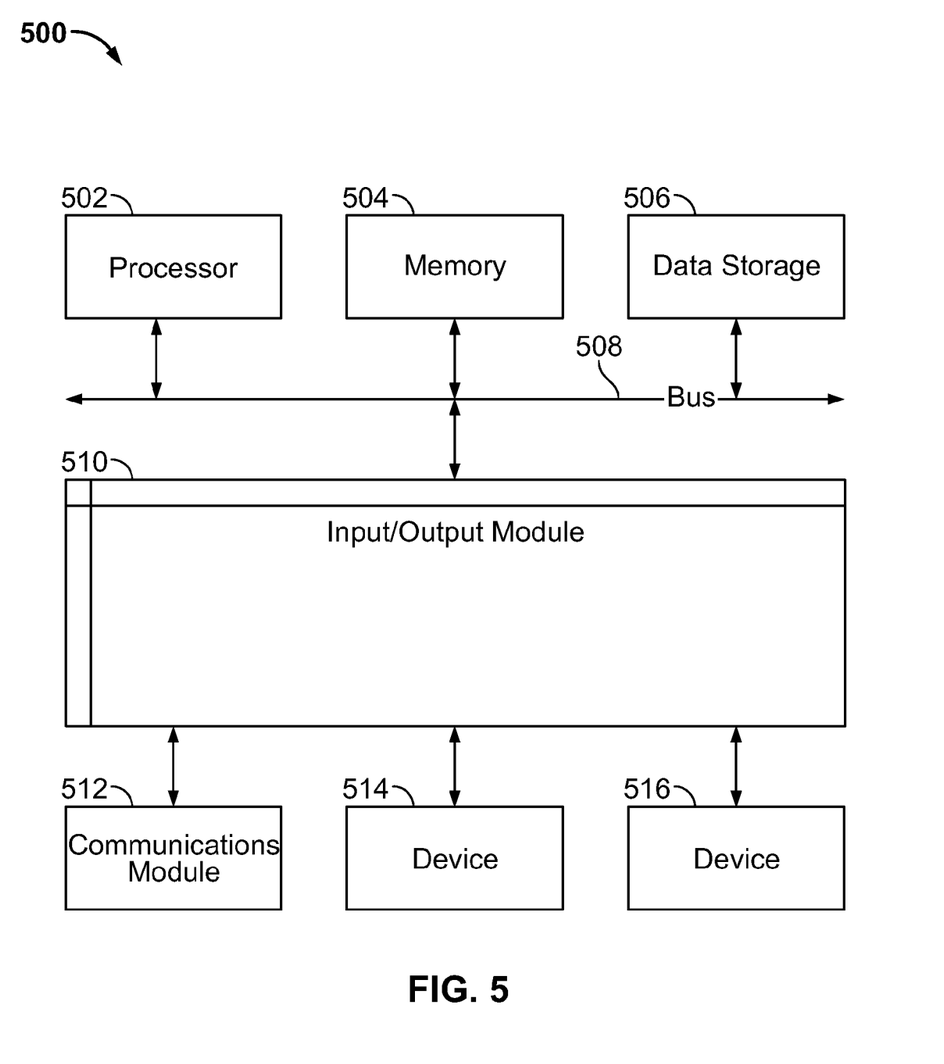
FIG. 5 is a block diagram illustrating an exemplary computer system with which the client and server of FIG. 2 can be implemented.

FIG. 5 is a block diagram illustrating an exemplary computer system 500 with which the client 110 and server 130 of FIG. 2 can be implemented. In certain aspects, the computer system 500 may be implemented using hardware or a combination of software and hardware, either in a dedicated server, or integrated into another entity, or distributed across multiple entities.

Computer system 500 (e.g., client 110 and server 130) includes a bus 508 or other communication mechanism for communicating information, and a processor 502 (e.g., processor 212 and 236) coupled with bus 508 for processing information. By way of example, the computer system 500 may be implemented with one or more processors 502. Processor 502 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 500 can include, in addition to hardware, code that creates an execution environment for the computer program in question, e.g., code that constitutes processor firmware, a protocol stack, a database management system, an operating system, or a combination of one or more of them stored in an included memory 504 (e.g., memory 216 and 232), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry.

The instructions may be stored in the memory 504 and implemented in one or more computer program products, i.e., one or more modules of computer program instructions encoded on a computer readable medium for execution by, or to control the operation of, the computer system 500, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, embeddable languages, and xml-based languages. Memory 504 may also be used for storing temporary variable or other intermediate information during execution of instructions to be executed by processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices. The input/output module 510 can be any input/output module. Exemplary input/output modules 510 include data ports such as USB ports. The input/output module 510 is configured to connect to a communications module 512. Exemplary communications modules 512 (e.g., communications module 214 and 238) include networking interface cards, such as Ethernet cards and modems. In certain aspects, the input/output module 510 is configured to connect to a plurality of devices, such as an input device 514 (e.g., input device 220) and/or an output device 516 (e.g., display device 222). Exemplary input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Exemplary output devices 516 include display devices, such as a LED (light emitting diode), CRT (cathode ray tube), or LCD (liquid crystal display) screen, for displaying information to the user.

According to one aspect of the present disclosure, the client 110 and server 130 can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in main memory 504 causes processor 502 to perform the process steps described herein. One or more processors in a multi-processing arrangement may also be employed to execute the sequences of instructions contained in memory 504. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 150) can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computing system 500 can include clients and servers. A client and server are generally remote from each other and typically interact through a communication network. The relationship of client and server arises by virtue of computer programs running on the respective computers and having a client-server relationship to each other. Computer system 500 can be, for example, and without limitation, a desktop computer, laptop computer, or tablet computer. Computer system 500 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer readable medium" as used herein refers to any medium or media that participates in providing instructions or data to processor 502 for execution. Such a medium may take many forms, including, but not limited to, non-volatile media, volatile media, and transmission media. Non-volatile media include, for example, optical disks, magnetic disks, or flash memory, such as data storage device 506. Volatile media include dynamic memory, such as memory 504. Transmission media include coaxial cables, copper wire, and fiber optics, including the wires that comprise bus 508. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The subject matter of this specification has been described in terms of particular aspects, but other aspects can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

These and other implementations are within the scope of the following claims.

What is claimed is:

1. A computer-implemented method for automatically configuring a device with network settings retrieved using a web browser, the method comprising:
    receiving a user identification associated with a user web browser profile;
    retrieving from a memory network setting information associated with the user web browser profile, wherein the network setting information is configured to be designated as unsecured, secured, or private; and
    providing the retrieved network setting information designated as unsecured or secured to a web browser of a device, wherein the retrieved network setting information designated as unsecured or secured comprises a wireless network access point name, and restricting access of the web browser to retrieved network setting information designated as private, wherein the retrieved network setting information designated as private comprises virtual private network (VPN) network settings,
    wherein the retrieved network setting information is configured to be used by the web browser to configure the device to connect to at least one network, and
    wherein the user identification is provided to the web browser independent of the web browser having access to a web page.

2. The computer-implemented method of claim 1, wherein the retrieved network settings are provided from a server.

3. The computer-implemented method of claim 2, wherein the retrieved network settings are configured to be provided by the web browser of the device to a network interface of the device in order to configure the network interface of the device with the network settings.

4. The computer-implemented method of claim 2, wherein unsecured network settings are configured to be stored on the server, stored on the device, and accessible to an authenticated user of the client.

5. The computer-implemented method of claim 2, wherein secured network settings are configured to restrict access to passwords and be selectively accessible to an authenticated user of the device.

6. The computer-implemented method of claim 1, wherein the network setting information comprises wireless network access point settings, virtual private network settings, and proxy settings.

7. The computer-implemented method of claim 6, wherein the wireless network access point settings comprise at least one of the wireless network access point name, a wireless network password, and a wireless network security protocol.

8. The computer-implemented method of claim 6, wherein the virtual private network settings comprise at least one of a password, biometric, two-factor authentication, cryptographic information, and digital certificate.

9. The computer-implemented method of claim 6, wherein the proxy settings comprise at least one of a network address and a port number.

10. A system for automatically configuring a device with network settings retrieved using a web browser, the system comprising:
- a memory comprising network setting information associated with a user web browser profile;
- a processor configured to:
  - receive a user identification associated with the user web browser profile;
  - retrieve the network setting information associated with the user web browser profile, wherein the network setting information is configured to be designated as unsecured, secured, or private; and
  - provide the retrieved network setting information designated as unsecured or secured to a web browser of a device, wherein the retrieved network setting information designated as unsecured or secured comprises a wireless network access point name, and restrict access of the web browser to retrieved network setting information designated as private, wherein the retrieved network setting information designated as private comprises virtual private network (VPN) network settings,
  - wherein the retrieved network setting information is configured to be used by the web browser to configure the device to connect to at least one network,
  - wherein the network setting information comprises wireless network access point settings, virtual private network settings, and proxy settings, and
  - wherein the user identification is provided to the web browser independent of the web browser having access to a web page.

11. The system of claim 10, wherein the retrieved network settings are provided from a server.

12. The system of claim 11, wherein the retrieved network settings are configured to be provided by the web browser of the device to a network interface of the device in order to configure the network interface of the device with the network settings.

13. The system of claim 11, wherein unsecured network settings are configured to be stored on the server, stored on the device, and accessible to an authenticated user of the device.

14. The system of claim 11, wherein secured network settings are configured to restrict access to passwords and be selectively accessible to an authenticated user of the client.

15. The system of claim 10, wherein
- the wireless network access point settings comprise at least one of the wireless network access point name, a wireless network password, and a wireless network security protocol,
- the virtual private network settings comprise at least one of a password, biometric, two-factor authentication, cryptographic information, and digital certificate, and
- the proxy settings comprise at least one of a network address and a port number.

16. A non-transitory machine-readable storage medium comprising machine-readable instructions for causing a processor to execute a method for automatically configuring a device with network settings retrieved using a web browser, the method comprising:
- receiving a user identification associated with a user web browser profile;
- retrieving network setting information associated with the user web browser profile that is configured to be designated as unsecured, secured, or private;
- providing the retrieved network setting information designated as unsecured or secured to a web browser on a device, wherein the retrieved network setting information designated as unsecured or secured comprises a wireless network access point name; and
- restricting access of the web browser to network settings designated as private, wherein the retrieved network setting information designated as private comprises virtual private network (VPN) network settings,
- wherein the retrieved network setting information is configured to be used by the web browser to configure the device to connect to at least one network, and
- wherein the user identification is provided to the web browser independent of the web browser having access to a web page.

* * * * *